US005966207A

United States Patent [19]
Haskins et al.

[11] Patent Number: 5,966,207
[45] Date of Patent: Oct. 12, 1999

[54] METHODS FOR IDENTIFYING OPTICAL FIBERS WHICH EXHIBIT ELEVATED LEVELS OF POLARIZATION MODE DISPERSION

[75] Inventors: Lori L. Haskins, Wilmington, N.C.; Annette L. Vandervort, Corning, N.Y.

[73] Assignee: Corning Incorporated, Corning, N.Y.

[21] Appl. No.: 09/133,752

[22] Filed: Aug. 13, 1998

Related U.S. Application Data

[60] Provisional application No. 60/055,677, Aug. 18, 1997.

[51] Int. Cl.[6] .................................................. G01N 21/00
[52] U.S. Cl. ............................................................ 356/73.1
[58] Field of Search ...................... 385/11, 15; 356/73.1

[56] References Cited

U.S. PATENT DOCUMENTS

| | | |
|---|---|---|
| 5,412,745 | 5/1995 | Weidman et al. . |
| 5,479,251 | 12/1995 | Hanson ................................... 356/73.1 |
| 5,518,516 | 5/1996 | Garnham . |

FOREIGN PATENT DOCUMENTS

| | | |
|---|---|---|
| 0 213 778 | 3/1987 | European Pat. Off. . |
| 2179171A | 2/1987 | United Kingdom . |

OTHER PUBLICATIONS

C. Shaar, "Bumpy Fiber Effects", TIA 6.6.5 Standards Meeting, Jan. 24, 1995, pp. 19–29.

S. Lacroix et al., "All–fiber wavelength filter from successive biconical tapers", Optical Letters, 1986, vol. 11, No. 10, pp. 671–673.

A.C. Boucouvalas, "Biconical Taper Coaxial Optical Fibre Coupler", Electronics Letters, 1985, vol. 21, pp. 864–865.

Product description sheet entitled "Wavelength Filters with Tapered Optical Fibers".

*Primary Examiner*—F. L. Evans
*Assistant Examiner*—Tu T. Nguyen
*Attorney, Agent, or Firm*—William J. Chervenak

[57] ABSTRACT

Methods for identifying optical fibers which exhibit elevated levels of polarization mode dispersion (PMD) are provided. The methods employ difference traces obtained from optical time domain reflectometer (OTDR) measurements. The presence of a cyclical pattern in such a difference trace has been found to be indicative of a fiber having an elevated level of PMD.

8 Claims, 6 Drawing Sheets

RAW DIFFERENCE TRACE

Fiber Length, km

SMOOTHED DIFFERENCE TRACE

Fiber Length, km

METHODS FOR IDENTIFYING OPTICAL FIBERS WHICH EXHIBIT ELEVATED LEVELS OF POLARIZATION MODE DISPERSION

This application claims benefit of provisional application Ser. No. 60/055,677 filed Aug. 18, 1997.

FIELD OF THE INVENTION

This invention relates to optical fibers and, in particular, to methods for identifying optical fibers which exhibit elevated levels of polarization mode dispersion (PMD).

BACKGROUND OF THE INVENTION

PMD is an important factor in the design of state-of-the-art fiber optic transmission systems. The effect of PMD in fiber systems is evident when, after propagating a sufficient distance in the network, one digital pulse may spread in the time domain and become indistinguishable from a nearby pulse. The pulse spreading from PMD can introduce errors into the data transmission, effectively limiting the transmission rate of the pulses or the maximum distance of the concatenated fiber medium.

Fiber manufacturers are therefore interested in providing fibers with low PMD, particularly for products targeted for high data rate, long-haul transmission systems. Unfortunately, measuring PMD directly is an expensive processing step. Accordingly, an easy-to-use, indirect method for identifying fibers with high PMD would be of great value to the industry in that it would reduce measurement (quality control) costs, and therefore overall manufacturing costs, for low PMD optical fibers. Optical time domain reflectometers (OTDRs) have been used to measure a variety of properties of optical fibers. OTDRs operate by sending a short pulse of laser light down an optical waveguide fiber and observing the small fraction of light that is scattered back towards the source. Typical pulsewidths may range from 0.5 meters (5 nanoseconds) to 2000 meters (20 microseconds).

In practice, the fiber under test is connected to the OTDR by a relatively short length of fiber (e.g., a one kilometer length of fiber) known in the art as a "pigtail." The pigtail reduces the deadzone (non-linear region) at the start of the fiber where the OTDR does not provide reliable information. To further improve performance, an index matching oil can be used at the junction between the pigtail and the fiber.

A typical OTDR trace is shown in FIG. 1 where returned power in dBs is plotted along the y-axis and distance down the fiber is plotted along the x-axis. Various features of this trace are identified by the reference numbers 1 through 9, where the number 1 shows the reflection which occurs at the junction between the OTDR and the pigtail, the number 2 shows the trace obtained from the pigtail, the number 3 shows the last point of the pigtail and the first point of fiber under test, the number 4 shows the reflection and associated deadzone produced by the junction between the pigtail and test fiber, the number 5 shows the first point after the near-end deadzone at which trace information can be examined reliably (the "fiber start"), the number 6 shows the fiber trace between the fiber start and the physical end of the fiber (the "fiber end"), the number 7 shows the fiber end, the number 8 shows the reflection which occurs at the fiber end, and the number 9 shows the inherent noise level of the OTDR trace.

Some reports of cyclical patterns in OTDR traces have appeared in the literature. Thus, at the Jan. 24, 1995 TIA 6.6.5 Standards Meeting, Casey Shaar of Photon Kinetics presented a report entitled "Bumpy Fiber Effects." The report describes ripple-like patterns in OTDR traces. The ripples are said to be caused either by polarization effects or by the OTDR source spectrum.

The ripples of this report are different from those of the present invention because, among other things, they have a much shorter period than the cyclical pattern of the present invention (e.g., 200–300 meters versus 2–3 kilometers), are more variable with changes in wavelength (e.g., from 1310 nanometers to 1550 nanometers), and change significantly when observed from different ends of a fiber. Furthermore, the ripples of this reference have a certain "character" in the raw OTDR trace (cycle period, magnitude, shape), and a different character in the mode field diameter (MFD) trace (the ripples may add constructively or destructively). In contrast, the cycles in the raw OTDR trace of the present invention combine in phase in the MFD trace, increasing the amplitude of the cycles but leaving the cycle period and shape unchanged.

Garnham, U.S. Pat. No. 5,518,516, describes ripples in OTDR traces which are said to be caused by helical ridges introduced during the preform laydown process. The patent describes a process for preparing preforms which is said to eliminate such ripples. The ripples which Garnham describes generally extend over the entire length of a blank, whereas the ripples which are the subject of the present invention generally start and stop at different parts of a blank. In practice, ripples of the type described in Garnham have been found not to correlate with elevated levels of PMD.

With regard to the present invention, it is important to note that neither the Photon Kinetics paper nor the Garnham patent contains any suggestion that ripples in OTDR or MFD traces can be used to identify fibers which exhibit elevated levels of PMD.

SUMMARY OF THE INVENTION

In view of the foregoing, it is an object of the present invention to provide improved methods for identifying optical fibers which exhibit elevated levels of PMD. More particularly, it is an object of the invention to provide an easy-to-use, indirect method for identifying such fibers.

To achieve these and other objects, the invention provides a method for detecting an elevated level of polarization mode dispersion in an optical fiber comprising:

a) applying light to a first end of the optical fiber using an OTDR;

b) detecting the light reflected back to the OTDR from the fiber and generating a first set of values which comprise the amplitude of the detected reflected light as a function of distance along the length of the fiber from the first end of the fiber;

c) applying light to a second end of the optical fiber using an OTDR (either the same OTDR used in step (a) or a different OTDR);

d) detecting the light reflected back to the OTDR from the fiber and generating a second set of values which comprise the amplitude of the detected reflected light as a function of distance along the length of the fiber from the second end of the fiber;

e) forming a third set of values from the first and second sets of values, the third set of values being indicative of variations of the fiber's mode field diameter along its length; and f) detecting a cyclical pattern having at least one predetermined characteristic as a function of distance along the length of the fiber in the third set of values, the presence of the cyclical pattern being indicative of an elevated level of PMD.

DESCRIPTION OF THE PREFERRED EMBODIMENTS

The following terminology and general procedures apply to the preferred embodiments of the invention:

(1) Backscatter trace: A plot of the log of backscatter power as measured by an OTDR from a single end of an optical waveguide fiber. This is the plot one usually observes. The first and second sets of values discussed above can be plotted as backscatter traces.

(2) Brown end/Green end: The particular end from which a unidirectional OTDR measurement is made. The green end/brown end terminology corresponds to the first end/second end terminology used above and in the claims.

(3) Bi-directional inversion: The view, as measured from the brown end, is inverted in both position and in value to be in alignment with the view from the green end. The inversion in position requires an identification of the start and end of the actual fiber, the removing of pigtail and end reflections, and the adding of an offset value to the brown end view. End identification can be done using the reflections at the pigtail splice and the end of the fiber. Calibration of the OTDR traces can be performed using a fiber having a reflection-type discontinuity. Bi-direction inversion is performed in obtaining the third set of values used to identify high PMD fibers.

(4) Difference trace: The difference between the brown end and green end traces after the brown end trace has been bi-directionally inverted. If the brown end trace is only inverted in direction but not in value, the difference trace can be obtained by simply adding the brown end and green end traces. The difference trace constitutes a preferred form of the third set of values.

(5) MFD variance plot: If desired, the difference trace can be transformed into a MFD variance plot using the following equation:

$$MFD(x) = MFD(0) \bullet 10^{(y(x)/20)}$$

where x is distance along the fiber, MFD(0) is the measured value of the mode field diameter at the end of the fiber (x=0), and y(x) is the difference trace. The MFD variance plot can be used as the third set of values if desired.

Figure 1:
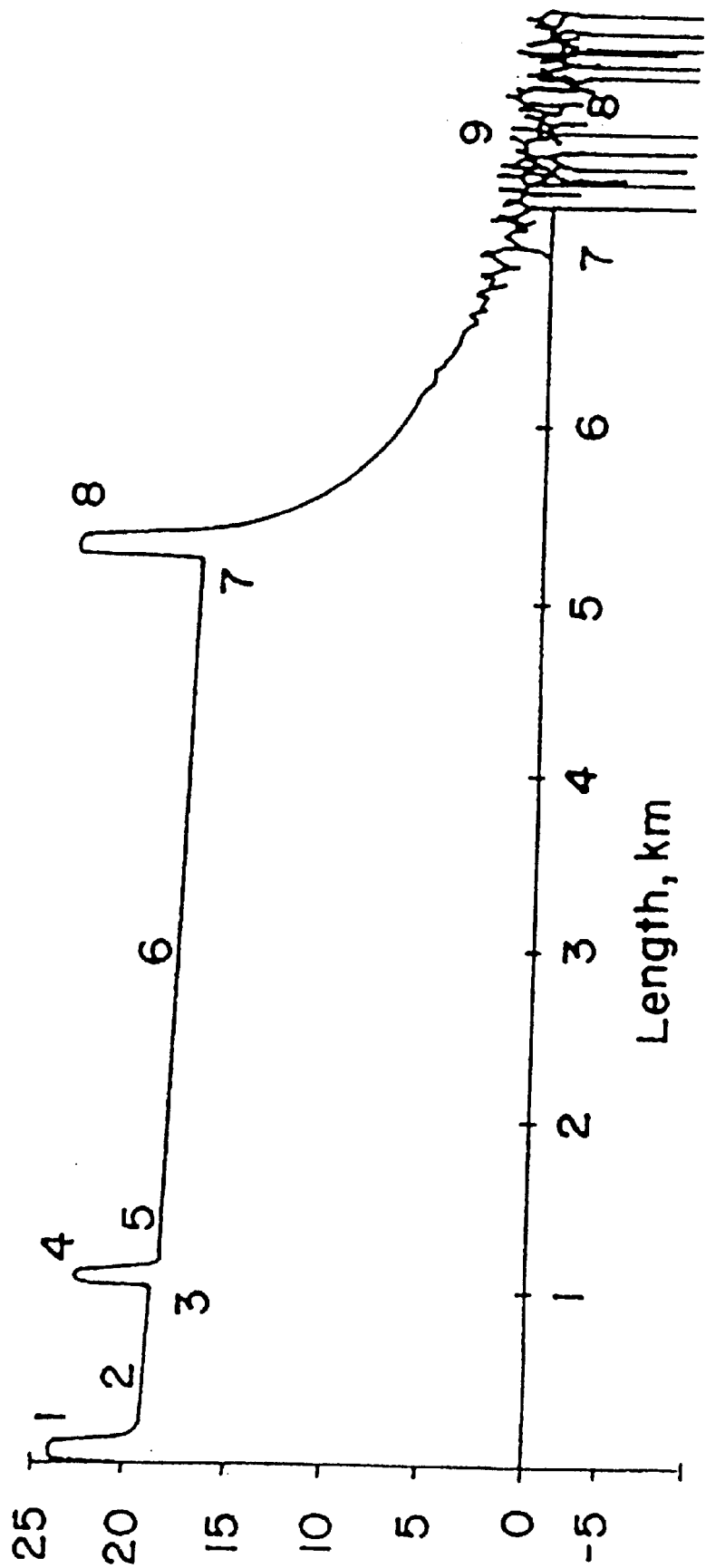
FIG. 1 shows a typical backscatter trace produced by an OTDR.
Figure 2:
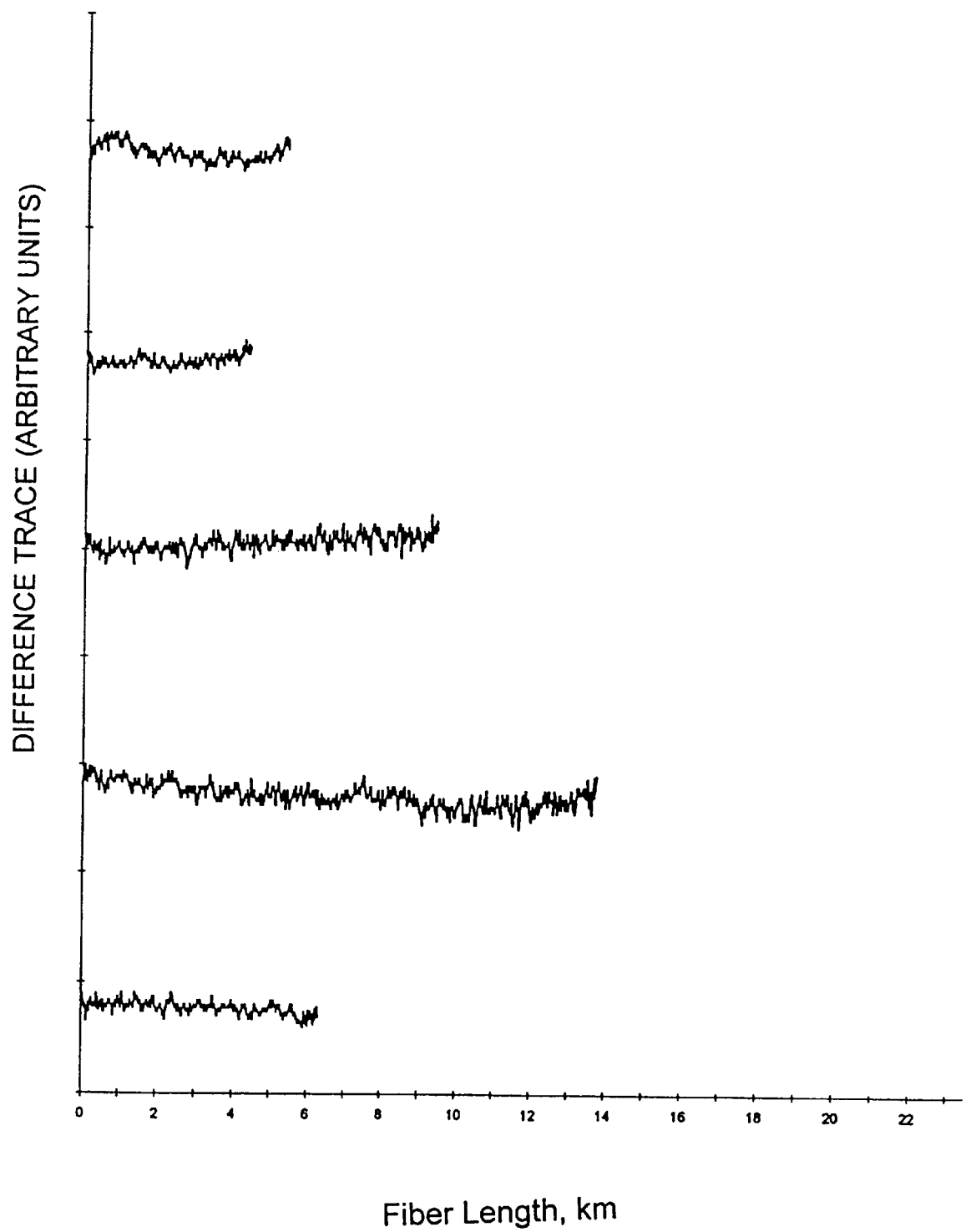
FIGS. 2 and 3 are difference traces illustrating fibers having low and high levels of PMD, respectively.
Figure 3:
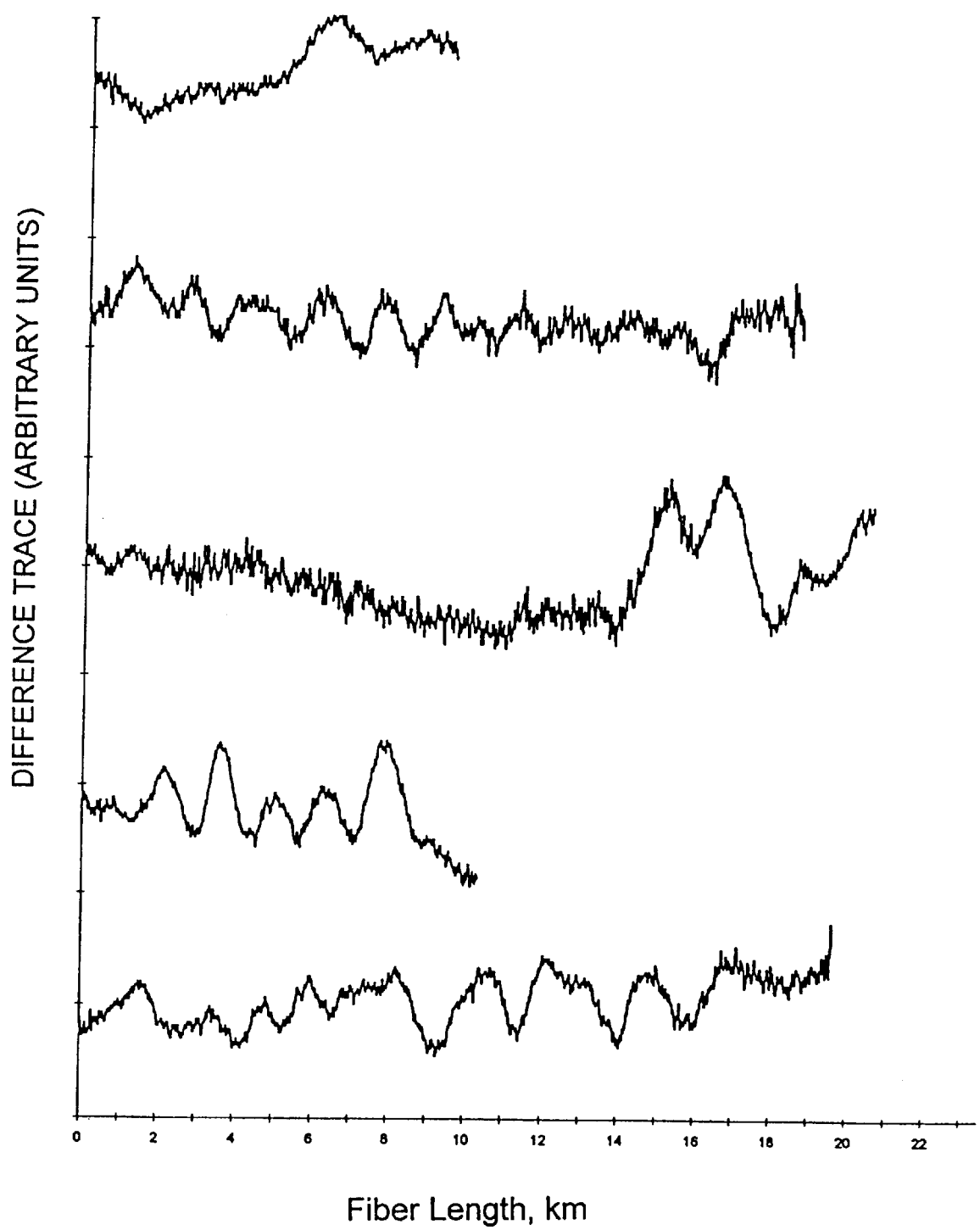

In accordance with the invention, it has been found that fibers having elevated levels of PMD exhibit cyclical patterns in their difference traces. FIGS. 2 and 3 illustrate the effect, where FIG. 2 shows difference traces for five fibers which exhibit low levels of PMD, while FIG. 3 shows five fibers with high levels of PMD. A comparison of these figures clearly shows the cyclical pattern of the high PMD fibers.

Quantification of the cyclical pattern, in particular, determination of the period of the cyclical pattern, is preferably performed in accordance with the procedures illustrated in the sequence of drawings in FIGS. 4A, 4B, 4C, 4D and 4E.

Figure 4A:
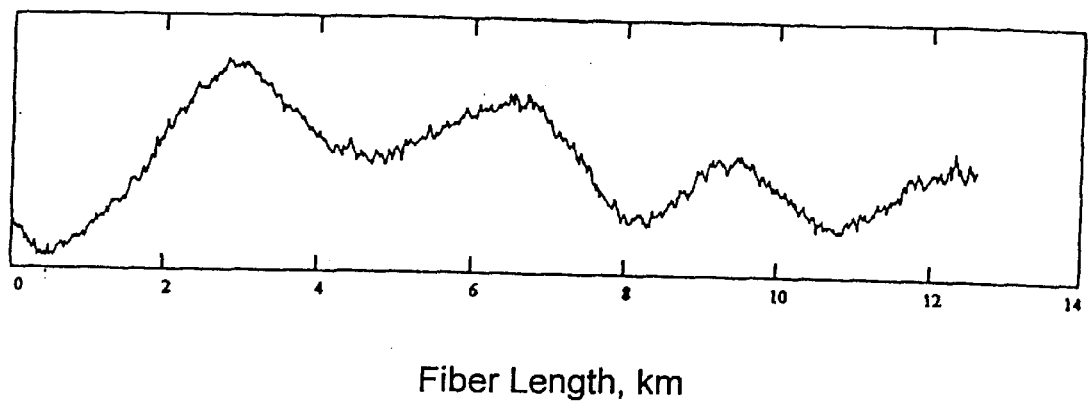
FIGS. 4A, 4B, 4C, 4D and 4E illustrate a procedure for quantifying the cyclical nature of the difference trace of a fiber having an elevated level of PMD. The solid lines in FIGS. 4D and 4E represent $yt_j$ values, the dotted line in FIG. 4D represents $ym_j$ values, and the dotted line in FIG. 4E represents $prev_j$ values, all of which are defined below The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

FIG. 4A shows the starting raw data, specifically, a difference trace obtained from OTDR measurements. The raw data of this figure is composed of 1,238 difference trace values (0 . . . last), with the spacing ($\delta$) between data points corresponding to 0.0102 kilometers along the length of the fiber.

Figure 4B:
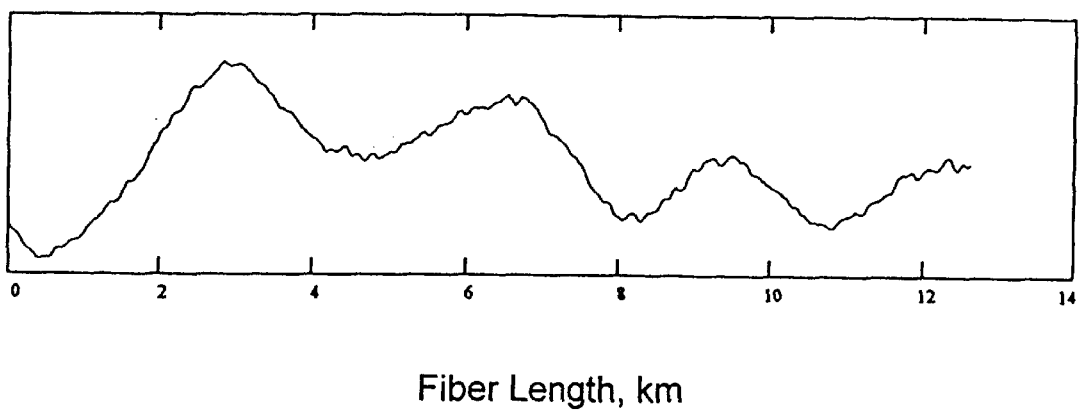

As a first step in the quantification process, the raw data is preferably smoothed using, for example, a 9-tap boxcar filter to reduce noise. FIG. 4B shows the results of applying such a filter to the trace of FIG. 4A.

Slope data is then obtained from the smoothed data. A suitable "window" for determining slope values ("ym" values) is, for example, 100 data points, i.e., approximately 1 kilometer for $\delta$=0.0102 kilometers.

Figure 4C:
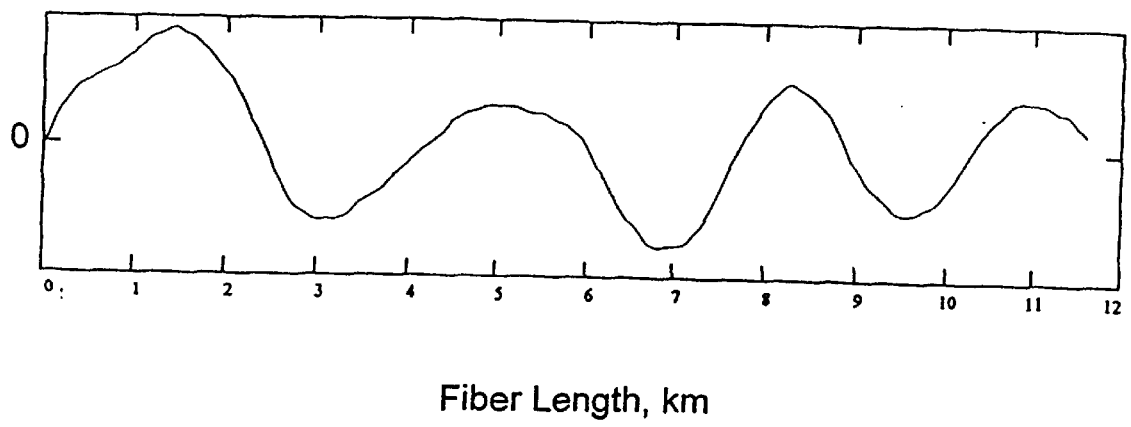
Figure 4D:
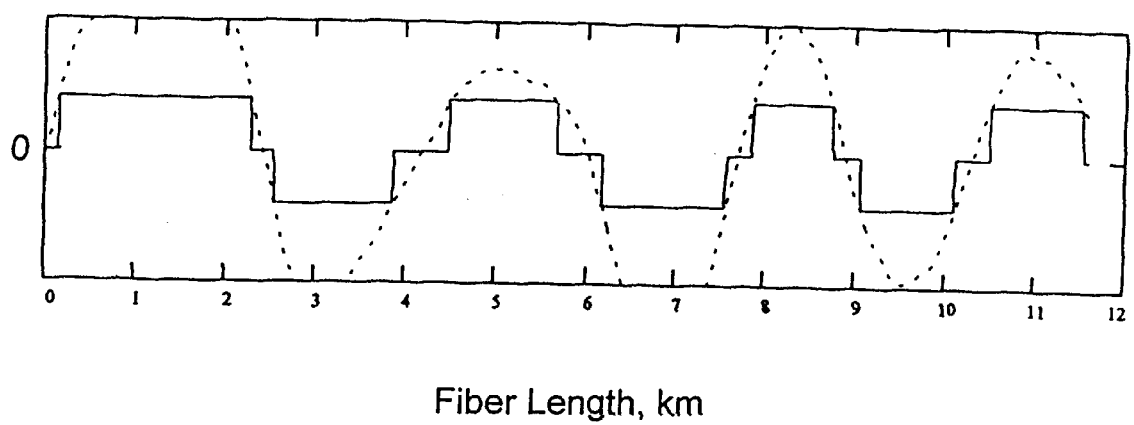

Half cycle counting is then performed on the slope data of FIG. 4C using a threshold to identify transitions from one half cycle to the next. FIG. 4D shows the results of applying the following equation to the data of FIG. 4C to obtain a first cut at the transitions, where the threshold ("thresh") was chosen to be 0.02 dB/km:

$$yt_j = \text{if}[ym_j \geq \text{thresh}, \text{thresh}, (\text{if}(ym_j \leq -\text{thresh}, -\text{thresh}, 0))]$$

where the formalism "if (criterion, a, b)" has the value "a" if the "criterion" is satisfied and has the value "b" otherwise.

Figure 4E:
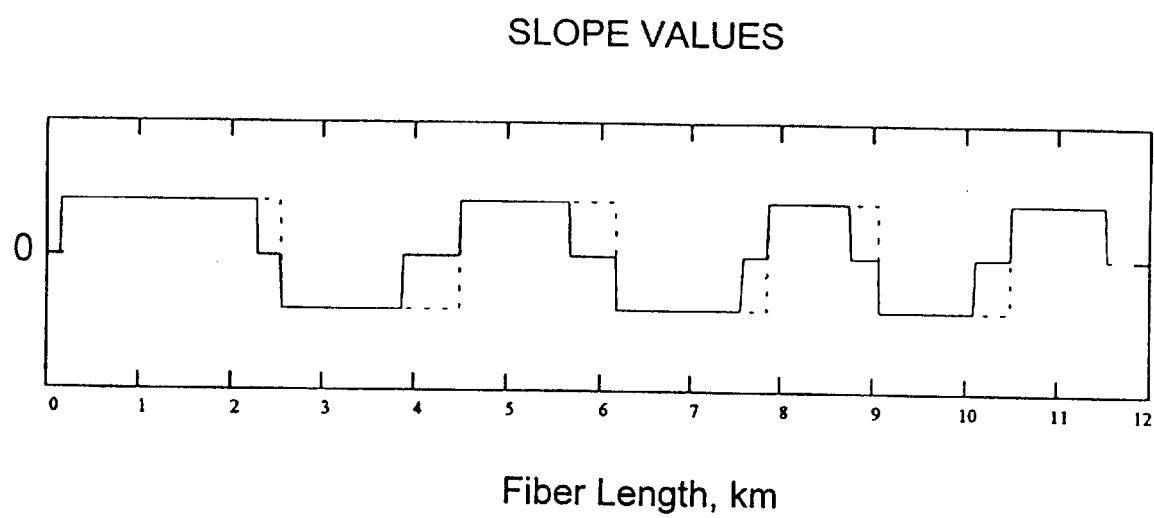

To finalize the identification of the transitions, the following equations are applied to the data of FIG. 4D to produce the data of FIG. 4E:

$$prev_0 = 0$$

$$j2 = 1 \ldots \text{last-window} + 1$$

$$prev_{j2} = \text{if}(yt_{j2} = \text{thresh}, \text{thresh}, 0)$$

$$prev_{j2} = \text{if}(yt_{j2} = -\text{thresh}, -\text{thresh}, prev_{j2})$$

$$prev_{j2} = \text{if}(yt_{j2} = 0, prev_{j2-1}, prev_{j2})$$

Half cycle counting is readily performed on the data of FIG. 4E using the following procedure, where the variable "level" equals the number of half cycles:

$$j3 = 0 \ldots \text{last-window}$$

$$count_{j3} = \text{if}(prev_{j3} \bullet prev_{j3+1} = \text{thresh}^2, 1, 0)$$

$$level = \sum_{j3} count_{j3}$$

$$level = \text{if}(level \bigcirc 1, level + 1, level)$$

For the data of FIG. 4E, this procedure counted 7 half cycles (level=7). As the final step in quantification, the period of the cyclical variation of the difference trace is calculated using the number of data points (the "last" value), the spacing between data points (the "δ" value), and the number of half cycles (the "level" value) as follows:

$$period = 2 \bullet last \bullet \delta / level$$

For the data of FIG. 4, the calculated period was 3.605 kilometers.

The particular "window" and "threshold" values used to prepare FIG. 4 are, of course, only illustrative. More generally, a variety of quantification procedures known in the art, other than those illustrated by FIG. 4, can be used to analyze difference traces (or other MFD indicative data) for periodic behavior. For example, the slope values (e.g., |ym| values) can be examined and a threshold applied ("slope threshold") to confirm that sufficient variation exists in the difference trace. Also the MFD values can be examined and a minimum MFD difference value (i.e., the difference between the fiber's maximum MFD value and its minimum MFD value) can be established as a prerequisite for analysis for periodic behavior.

Quantification of the cyclical pattern, however performed, can be used to establish quality control procedures for identifying fibers having elevated levels of PMD. Among the parameters which can be used for this purpose are the period of the cyclical pattern, the maximum slope of the pattern, the minimum slope of the pattern, and the maximum peak-to-peak deviation of the pattern. Combinations of these parameters can also be used in identifying unacceptable product.

By way of example, the following criterion has been found suitable for separating fibers having unacceptable PMD levels (e.g., fibers having difference traces of the type shown in FIG. 3) from those having acceptable PMD levels (e.g., fibers having difference traces of the type shown in FIG. 2): reject fiber if period as determined by the procedure illustrated by the sequence of drawings in FIGS. 4A, 4B, 4C, 4D and 4E using a threshold value of 0.02 dB/km is in the range from 1.5 kilometers to 10 kilometers. In applying this criterion, it is first determined that the fiber has a |ym| value greater than 0.025 dB/km and a MFD difference value of at least 0.04 microns.

Other quantitative criteria can, of course, be established for particular fibers by persons skilled in the art based on the disclosure hereof. In general, such criteria are established by measuring PMD values for various fibers, measuring quantitative criteria for the difference traces for those fibers, and correlating the PMD values with the quantitative criteria.

As noted above, data is taken from a relatively short length of fiber, e.g. approximately one kilometer. This measurement is usually performed on the fiber after it is wound onto a relatively small shipping spool. This winding may be taken from either a larger bulk spool or directly from the draw apparatus. In some cases, the cylce period may be so large that it may not be evident in a short length of fiber. In such cases it may be necessary to produce a MFD trace from data taken from a longer length of fiber drawn from the entire glass blank and make the cyclical determination from this data.

One method for making such a measurement is to measure each small reel of fiber individually from a single blank using the OTDR and generating a MFD trace for each reel of fiber. After the entire blank has been measured in this way, additional processing of the data from each reel of fiber is performed on an off-line computer to concatenate the data and generate a fourth set of values that are indicative of a single MFD trace for the entire blank. The cyclical determination can be made on this total blank map and the region of the blank, which may be several reels worth of fiber, containing the cyclical behavior can be identified.

It should be noted that a cyclical pattern may not always be a definitive predictor of PMD performance. For instance, some fibers may appear cyclical but have low PMD values. For example, ripples of the type discussed in the Garnham patent referred to above may result in a fiber having a cyclic pattern but not a high PMD level. Although not wishing to be bound by any particular theory of operation, it is believed that this may depend on product type and manufacturing equipment (e.g., some furnace types have a better correlation between cyclical traces and elevated PMD than others). In addition, the root cause for all instances of elevated PMD are not known in the art. Some of these causes may not be related to difference trace uniformity (MFD trace uniformity) and therefore are not likely to be identified by searching for cyclical patterns in such traces. The disclosures herein will allow persons skilled in the art to identify those cases in which cyclical patterns are and are not predictive of PMD levels.

The mathematical operations described herein can be performed using a variety of computers and software. For example, those operations can be performed using the commercially available MATHCAD program (MathSoft, Inc., Cambridge, Mass.) and a personal computer configured to run that program in accordance with the program manufacturer's specifications.

Although preferred and other embodiments of the invention have been described herein, further embodiments may be perceived by those skilled in the art without departing from the scope of the invention as defined by the following claims.

What is claimed is:

1. A method for detecting an elevated level of polarization mode dispersion in an optical fiber comprising:

a) applying light to a first end of the optical fiber using an optical time domain reflectometer (OTDR);

b) after step a), detecting the light reflected back to the OTDR from the fiber and generating a first set of values which comprise the amplitude of the detected reflected light as a function of distance along the length of the fiber from the first end of the fiber;

c) applying light to a second end of the optical fiber using an OTDR;

d) after step c), detecting the light reflected back to the OTDR from the fiber and generating a second set of values which comprise the amplitude of the detected reflected light as a function of distance along the length of the fiber from the second end of the fiber;

e) forming a third set of values from the first and second sets of values, variations in said third set of values being indicative of variations, if any, of the fiber's mode field diameter along its length; and f) detecting in said third set of values a cyclical pattern having at least one predetermined characteristic as a function of distance along the length of the fiber, the presence of said cyclical pattern being indicative of an elevated level of PMD.

2. The method of claim 1 wherein in step (e), the third set of values is formed by taking differences between the values of the first set of values and the values of the second set of values.

3. The method of claim 1 wherein the third set of values constitutes mode field diameter values obtained from differences between the values of the first set of values and the values of the second set of values.

4. The method of claim 1 wherein step (f) comprises:
i) smoothing the third set of values;
ii) converting the smoothed third set of values to slope values; and
iii) counting the number of cycles in the slope values.

5. The method of claim 1 wherein said at least one predetermined characteristic is selected from the group consisting of a cycle period of the third set of values, a maximum slope value of the third set of values, a minimum slope value of the third set of values, a maximum peak-to-peak deviation of the third set values, and combinations of two or more thereof.

6. The method of claim 1 wherein said at least one predetermined characteristic is a cycle period of the third set of values.

7. The method of claim 1 wherein steps (a)–(e) are performed on 2 or more individual lengths of fiber drawn from a single blank.

8. The method of claim 7 wherein said first set, said second set and said third set of values for each of said individual lengths of fiber are concatenated forming a fourth set of values being indicative of variations of the fiber's mode field diameter along its entire length.

* * * * *